United States Patent
Graves et al.

(10) Patent No.: US 10,308,259 B1
(45) Date of Patent: Jun. 4, 2019

(54) SLIP DETERMINING SYSTEM AND METHODS FOR A MACHINE

(71) Applicant: Caterpillar Inc., Deerfield, IL (US)

(72) Inventors: Nolan A. Graves, Peoria, IL (US); Nicholas R. Vogel, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 16/005,319

(22) Filed: Jun. 11, 2018

(51) Int. Cl.
*B60Q 1/00* (2006.01)
*B60W 40/101* (2012.01)
*B60W 40/109* (2012.01)
*B60W 40/107* (2012.01)

(52) U.S. Cl.
CPC ........ *B60W 40/101* (2013.01); *B60W 40/107* (2013.01); *B60W 40/109* (2013.01); *B60W 2520/125* (2013.01); *B60W 2720/263* (2013.01)

(58) Field of Classification Search
CPC ............. B60W 40/101; B60W 2520/20; B60T 2230/02
USPC ..................... 340/441; 701/82, 90
See application file for complete search history.

(56) References Cited

U.S. PATENT DOCUMENTS

| | | | |
|---|---|---|---|
| 7,092,808 B2 | 8/2006 | Lu et al. | |
| 7,885,750 B2 | 2/2011 | Lu | |
| 7,908,112 B2 * | 3/2011 | Nardi | B60T 8/172 702/142 |
| 8,086,367 B2 | 12/2011 | Ryu et al. | |
| 8,890,747 B2 | 11/2014 | Nardi et al. | |
| 9,365,196 B2 | 6/2016 | Vorreiter | |
| 9,753,144 B1 | 9/2017 | Jafari et al. | |
| 2010/0019963 A1 | 1/2010 | Gao et al. | |
| 2017/0137004 A1 | 5/2017 | Suzuki et al. | |
| 2018/0312170 A1* | 11/2018 | Bando | B62D 6/00 |

FOREIGN PATENT DOCUMENTS

| | | |
|---|---|---|
| JP | 2014-108728 A | 6/2014 |
| TW | 200925008 A | 6/2009 |

* cited by examiner

*Primary Examiner* — Toan N Pham
(74) *Attorney, Agent, or Firm* — Bookoff McAndrews (57) ABSTRACT

A system for determining movement characteristics of a mobile machine may comprise: a sensor coupled to the machine and configured to communicate a signal indicative of a velocity of the machine, wherein the sensor is coupled to a portion of the machine that is disparate from a rear axle of the machine; an inertial measurement unit coupled to the machine and configured to communicate a signal indicative of an acceleration and an angular velocity of the machine; and a controller configured to: receive (a) the velocity signal and (b) the acceleration and angular velocity signal; and using (a) the velocity signal and (b) the acceleration and angular velocity signal, determine a lateral velocity of the rear axle of the machine.

20 Claims, 6 Drawing Sheets

SLIP DETERMINING SYSTEM AND METHODS FOR A MACHINE

TECHNICAL FIELD

The present disclosure relates generally to a mobile machine and, more particularly, to a system for determining the rear wheel slip of such a machine.

BACKGROUND

Mobile machines, such as haul machines, are frequently used at work sites to perform processes such as carrying a payload. For example, a machine may receive loads of material in a bed or dump body mounted on the machine. The machine may relocate such loads of material, unload the material, and return to an original site or travel to another location in order to receive further loads. These machines may be used in a variety of work sites, including, for example, quarries, mines, or other locations. These machines may be required to be maneuvered in precise or technical manners. For example, machines may be required to reverse to a specific location with low tolerances for error. Furthermore, increased automation of processes involving these machines may require information regarding an accurate and specific location of the machines. High accuracy positioning is also desirable for operator assist features.

In order to enable the precise maneuvering of machines, it is helpful to have accurate information regarding the location and heading of the machine. Some machines are equipped with sensors such as global navigation satellite system (GNSS) sensors or with other sensors for ranging triangulation. However, a GNSS sensor alone may be insufficient to determine the specific location or heading of the machine. In particular, because machines may be large, the dynamics measured using a GNSS sensor positioned at one location on a machine may not be an accurate indicator of the dynamics of the machine as a whole. With regard to machines such as haul machines, a GNSS sensor may be positioned at the front of the machine in order to avoid damage to the sensor by materials being loaded and hauled. A GNSS sensor located on a front portion of a machine may fail to accurately capture information regarding the position and behavior of the rear of the machine. For example, a GNSS sensor may be unable to determine a rear wheel slip of a machine. While a multitude of sensors, such as speed sensors, may be placed in different locations on a machine in order to more accurately capture position information and wheel slip, using a multitude of such sensors may be cost-prohibitive or otherwise undesirable.

U.S. Patent Publication No. 2017/0137004 (the '004 publication), filed by Suzuki et al. and published on May 18, 2017, describes an apparatus that calculates a vehicle body speed based on outputs of speed sensors on each of the four wheels. Thus, the system of the '004 publication does not present a method for using cost-effective sensors such as GNSS sensors and moreover requires the use of four separate speed sensors. Use of four separate speed sensors may not only be expensive but may also be maintenance intensive and require extra steps in manufacturing. The system of the present disclosure may solve one or more of the problems set forth above and/or other problems in the art. The scope of the current disclosure, however, is defined by the attached claims, and not by the ability to solve any specific problem.

SUMMARY

In one aspect, a system for determining movement characteristics of a mobile machine may comprise: a sensor coupled to the machine and configured to communicate a signal indicative of a velocity of the machine, wherein the sensor is coupled to a portion of the machine that is disparate from a rear axle of the machine; an inertial measurement unit coupled to the machine and configured to communicate a signal indicative of an acceleration and an angular velocity of the machine; and a controller configured to: receive (a) the velocity signal and (b) the acceleration and angular velocity signal; and using (a) the velocity signal and (b) the acceleration and angular velocity signal, determine a lateral velocity of the rear axle of the machine.

In another aspect, a method for determining movement characteristics of a mobile machine may comprise receiving a signal from a sensor coupled to the machine, wherein the sensor is coupled to the machine at a location disparate from a rear axle of the machine; receiving a signal from an inertial measurement unit coupled to the machine; using at least one of the sensor signal and the inertial measurement unit signal to determine a longitudinal velocity of the machine; using at least one of the sensor signal and the inertial measurement unit signal to determine an acceleration of the machine; and using the determined longitudinal velocity and the determined acceleration to determine a lateral velocity of the rear axle of the machine.

In yet another aspect, a method for characterizing movement of a machine may comprise: receiving signals from only: (a) a sensor coupled to a front portion of the machine; and (b) an inertial measurement unit coupled to the machine, wherein the signal includes an angular velocity of the machine; and using the sensor signal and the inertial measurement unit signal to determine a lateral velocity of a rear axle of the machine.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," substantially," and "approximately" are used to indicate a possible variation of ±10% in the stated value. Although the current disclosure is described with reference to a haul machine, this is only exemplary. In general, the current disclosure can be applied to any machine, such as, for example, any type of truck, loader, scraper, tractor, etc.

While the current disclosure references exemplary placements of sensors, such sensors may be placed in other suitable locations consistent with the present disclosure.

Figure 1A:
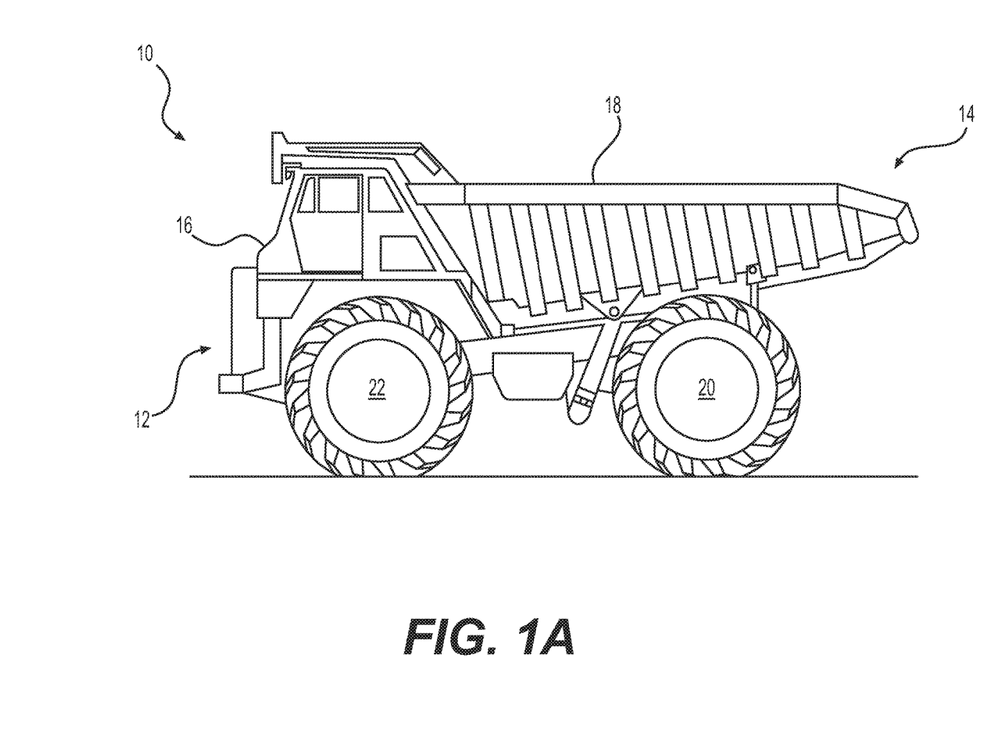
FIG. 1A is a side-view illustration of an exemplary machine.
Figure 1B:
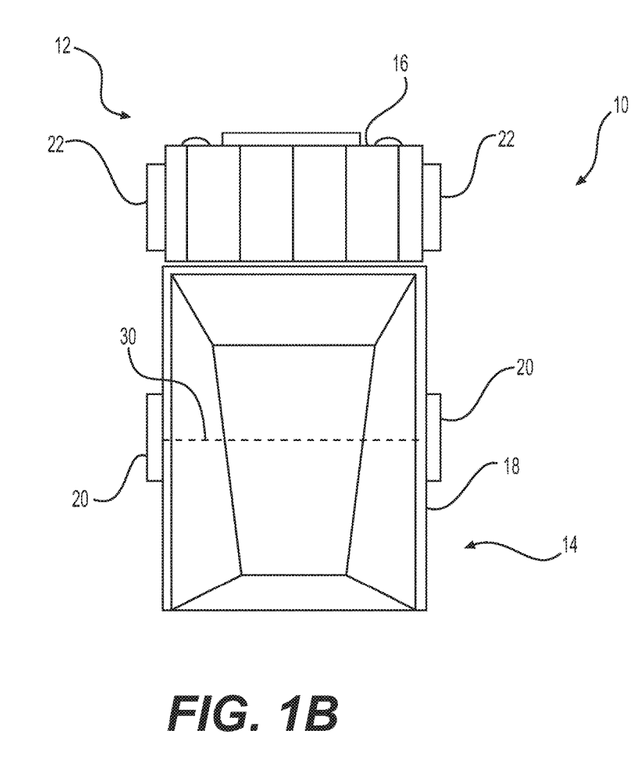
FIG. 1B is a top-view illustration of an exemplary machine.

FIGS. 1A-1B depict an exemplary haul machine 10. Machine 10 may include a front portion 12 and a rear portion 14. Front portion 12 may include an operator cab 16, which may be mounted above an engine enclosure. Operator cab 16 may include a control system having a plurality of inputs and displays. Rear portion 14 may include a dump body 18, which may be pivotally mounted to a frame of machine 10. Machine 10 may be supported on the ground by a pair of rear wheels 20 and a pair of front wheels 22. As shown by a dashed line in FIG. 1B, rear wheels 20 may be connected via a virtual or a physical rear axle 30. Rear axle 30 may not correspond to a physical axle of machine 10. Instead of having a physical axle, machine 10 may have a motor, such as an electric motor, at each wheel. Rear axle 30 may be a virtual line connecting rear wheels 20. The elements and layout of machine 10 are merely exemplary. The principles of the present disclosure may be applied to any type of machine.

Figure 2A:
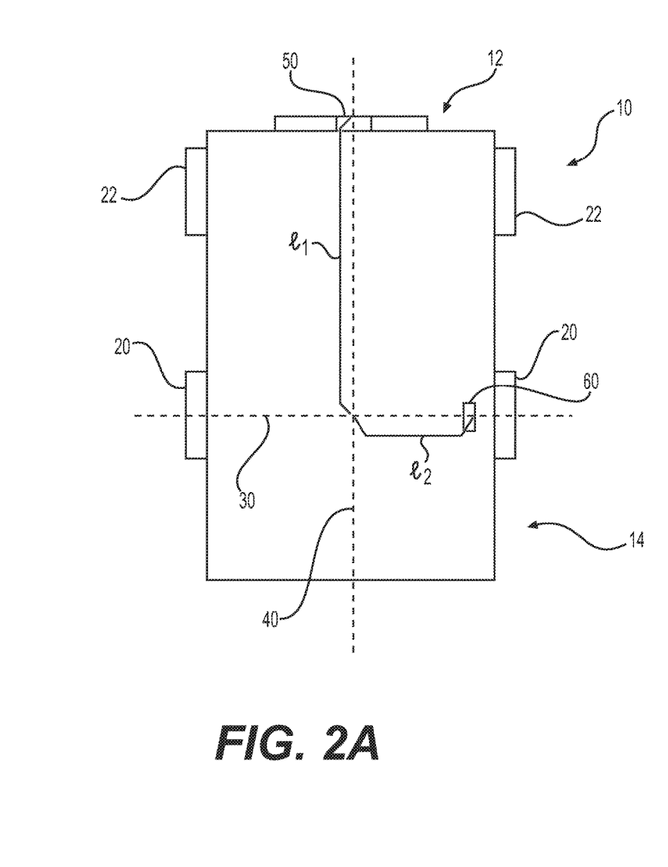
FIGS. 2A-2B are schematic diagrams showing a top-view of an exemplary machine and exemplary relations between different portions of the machine.

FIG. 2A depicts a schematic diagram of a top view of machine 10. As discussed above, dashed line 30 depicts a rear axle of machine 10, which connects rear wheels 20 to one another. Dashed line 40 shows a center longitudinal axis 40 of machine 10. Longitudinal axis 40 may extend from a front portion 12 of machine 10 to a rear portion 14 of machine 10. Longitudinal axis 40 need not correspond to a physical feature of machine 10 and instead may represent a figurative longitudinal divider of machine 10. While longitudinal axis 40 is depicted as a central longitudinal axis, longitudinal axis 40 need not be located at center of machine 10 and may be off to one side or another.

Machine 10 may include a global navigation satellite system (GNSS) sensor 50. While the term GNSS sensor may be used herein, other types of sensors may also be used. For example, other types of sensors may determine position or velocity by, for example, ranging triangulation. Such sensors may be satellite positioning sensors or other types of sensors. Thus, references to GNSS sensors below should be understood to incorporate any suitable position or velocity sensor that may communicate a velocity and/or position signal. GNSS sensor 50 may include, for example, an antenna and/or a receiver. GNSS sensor 50 may be mounted or otherwise positioned in any suitable position on machine 10. Certain exemplary machines 10 may include constraints on a placement of GNSS sensor 50. For example, where machine 10 is a dump truck, it may be undesirable to place GNSS sensor 50 toward a back of machine 10 where it may sustain damage. It may be desirable to place GNSS sensor 50 on a front portion 12 of machine 10 in such a circumstance. Similar situations may also arise with regard to other types of machine 10, where it is desirable to determine a precise velocity and/or position of a portion of machine 10 which is disparate from GNSS sensor 50. A position may be disparate where the difference in the position between the GNSS sensor 50 and the area of interest is such that the measurement from GNSS sensor 50 alone is not indicative of the position and/or velocity of the area of interest. For example, GNSS sensor 50 may be positioned on front portion 12 of machine 10, as shown in FIG. 2A, and the area of interest may be rear wheel 20 and/or rear axle 30.

While FIG. 2A depicts a GNSS sensor 50 mounted near a central longitudinal axis 40 of machine 10, GNSS sensor 50 may be located off to one side or the other of central longitudinal axis 40 of machine 10. And while FIG. 2A depicts GNSS sensor 50 as being mounted at a front edge of front portion 12 of machine 10, GNSS sensor 50 may be located in any suitable position. For example, GNSS sensor 50 may be positioned further toward a rear of machine 10. GNSS sensor 50 may be positioned on any suitable surface of machine 10. For example, GNSS sensor 50 may be located on a front surface of machine 10, or on a top surface of machine 10. GNSS sensor 50 may be enclosed in a housing of machine 10 or may be on an exterior surface of machine 10. GNSS sensor 50 may be any suitable type of antenna and/or receiver that is known or becomes known. For example, GNSS sensor 50 may be configured for use with the United States NAVSTAR global positioning system (GPS). In addition or in an alternative, GNSS sensor 50 may be configured for use with the Russian GLONASS system, the EU's Galileo system, and/or the Chinese BeiDou system.

Machine 10 may also include an inertial measurement unit (IMU) 60, which may include sensors that enable IMU 60 to determine an acceleration, angular rate, and/or surrounding magnetic field of machine 10. IMU 60 may transmit an acceleration and/or angular rate signal. IMU 60 may be mounted in any suitable position on machine 10. For example, IMU 60 may be positioned on rear portion 14 of machine 10, as shown in FIG. 2A. While FIG. 2A depicts IMU 60 mounted on or near a rear axle 30 of machine 10, IMU 60 may be disposed on any alternative location of machine 10. And while FIG. 2A shows IMU 60 mounted proximate to a rear wheel 20 of machine 10, IMU 60 may be instead located near a center longitudinal axis 40 of machine 40, in a wheel well of machine 10, or in any suitable location. IMU 60 may be positioned on any suitable surface of machine 10. For example, IMU 60 may be located on a bottom surface of machine 10, on a front or rear surface of machine 10, or on a top surface of machine 10. IMU 60 may be enclosed in a housing of machine 10 or may be on an exterior surface of machine 10. IMU 60 may be any suitable type of conventional inertial sensor. For example, IMU 60 may be an electronic device that measures and reports information about machine 10 including, for example, acceleration (such as a proper acceleration), angular rate, and/or magnetic field. IMU 60 may include, for example, one or more accelerometers, one or more gyroscopes, and/or one or more magnetometers.

FIG. 2A also shows various relationships between GNSS sensor 50, IMU 60, and/or rear axle 30. As described herein, a longitudinal direction may be a direction defined as a forward and/or backward direction. A longitudinal axis may extend between a rear of a component and a front a component. For example, a longitudinal axis 40 of machine 10 may extend between a rear portion 14 of machine 10 and a front portion 12 of machine 10. As described herein, a lateral direction may be a direction defined as a side-to-side direction. A lateral axis may extend between one side of a component and another side of a component. For example, rear axle 30 may extend in a lateral direction of machine 10. For example, $l_1$ may be a longitudinal distance (or position vector, where a direction is assigned) between GNSS sensor 50 and rear axle 30. Where GNSS sensor 50 is disposed at a different location of machine 10 than the exemplary position shown in FIGS. 2A and 2B, $l_1$ may include a lateral and/or a longitudinal component. Distance (or position vector, where a direction is assigned) $l_2$ may represent a lateral distance (or position vector) between a position on rear axle 30, such as an intersection between rear axle 30 and longitudinal axis 40, and IMU 60. Where IMU 60 is disposed at a different location of machine 10 than the exemplary position shown in FIGS. 2A and 2B, $l_2$ may include a lateral and/or a longitudinal component.

Figure 2B:
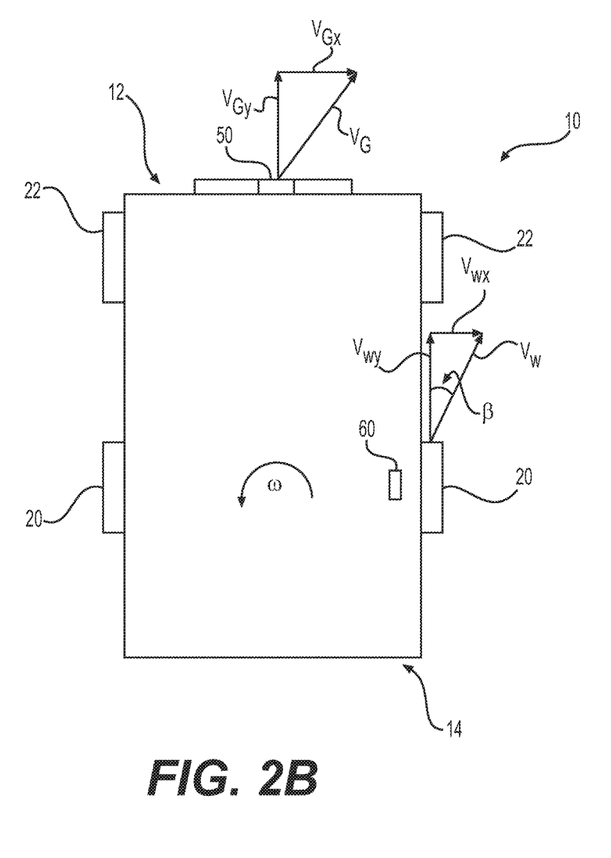

As shown in FIG. 2B, a velocity $v_G$ measured by GNSS sensor 50 may have a lateral component $v_{Gx}$ and a longitudinal component $v_{Gy}$. A lateral slip of rear wheel 20 may be caused by a lateral force on rear wheel 20 when machine 10 undergoes dynamics such as turning and rolling. A discussion of a lateral slip of rear wheel 20 and the resulting motion described herein may be understood as describing a motion of both rear wheels 20. Due to lateral slip, a velocity, $v_w$, of rear wheel 20 may differ from a longitudinal velocity, $v_{wy}$, of rear wheel 20. An angle between a velocity of rear wheel 20 and a longitudinal velocity of rear wheel 20 may be a slip angle, β, of rear wheel 20. Lateral slip may cause rear wheel 20 to have a lateral velocity $v_{wx}$. Measurements by a GNSS sensor 50 alone may not capture lateral slip information caused by forces on rear wheel 20. Therefore, data from GNSS sensor 50 may lack a precise ability to provide positioning of machine 10. For example, where a GNSS sensor 50 is placed on a front portion 12 of machine 10, as may be desirable for vehicles such as dump trucks, slip of rear wheels 20 may mean that measurements by GNSS sensor 50 do not reflect a motion of a rear portion 14 of machine 10, such as a truck bed or dump body 18. FIG. 2B also shows an angular velocity ω of machine 10. Angular velocity may be a vector having a substantially vertical direction (i.e, a direction out of the paper).

Figure 3:
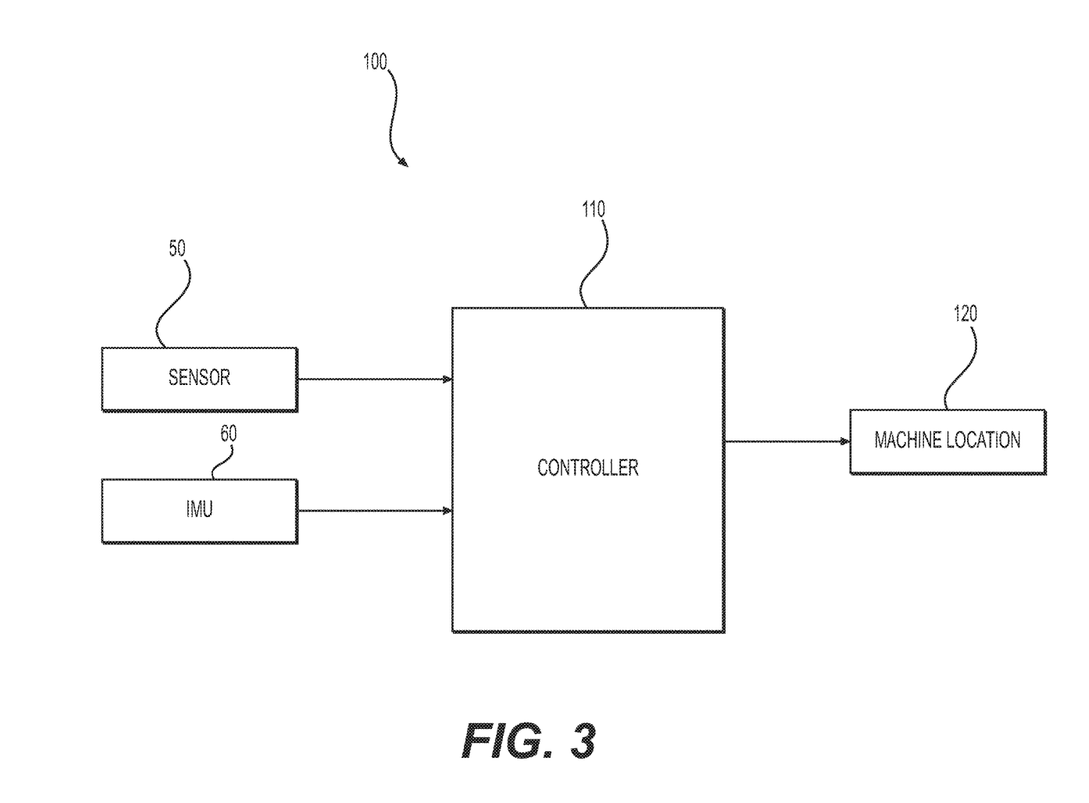
FIG. 3 is a block diagram of an exemplary control system for the machine of FIGS. 1A-2B.

FIG. 3 depicts an exemplary control system 100 for machine 10. Control system 100 may include a controller 110. Controller 110 may embody a single microprocessor or multiple microprocessors that may include means for monitoring operations of machine 10, issuing instructions to components of machine 10, and/or communicating with external devices. For example, controller 110 may include a memory, a secondary storage device, a clock, and a processor, such as a central processing unit or any other means for accomplishing a task consistent with the present disclosure. The memory or secondary storage device associated with controller 110 may store data and/or software routines that may assist controller 110 in performing its functions. Further, the memory or storage device associated with controller 110 may also store data received from various inputs associated with work machine 10. Numerous commercially available microprocessors can be configured to perform the functions of controller 110. It should be appreciated that controller 110 could readily embody a general machine controller capable of controlling numerous other machine functions. Various other known circuits may be associated with controller 110, including signal-conditioning circuitry, communication circuitry, hydraulic or other actuation circuitry, and other appropriate circuitry.

Controller 110 may receive information from inputs including GNSS sensor 50 and IMU 60. GNSS sensor 50 may provide controller 110 with information pertaining to a velocity and/or position of machine 10. IMU 60 may provide controller 110 with information pertaining to an acceleration (such as a proper acceleration) and/or angular velocity of machine 10. Outputs of IMU 60 may be used to calculate roll and/or pitch of machine 10. Combined with information from GNSS sensor 50, outputs of IMU 60 may improve estimation of heading and/or velocity. Based on data obtained from GNSS sensor 50 and IMU 60, controller 110 may determine an output 120 which may include a position of machine 10, a longitudinal and/or lateral velocity of machine 10, information about a slip of machine 10, and/or other information pertaining to a movement of machine 10. Output 120 may be determined using, for example, the processes described below with regard to FIG. 4.

Figure 4:
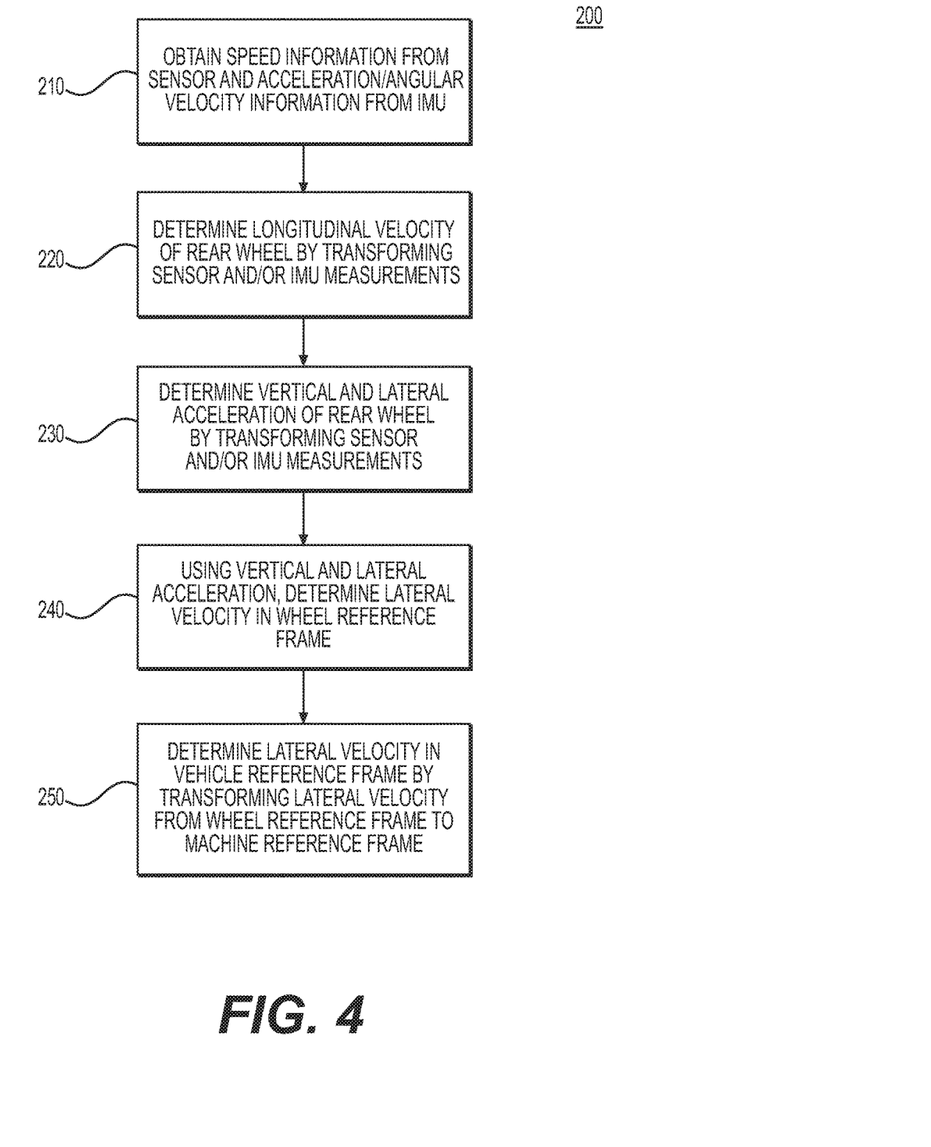
FIG. 4 is a flow diagram showing an exemplary control sequence for determining a lateral velocity of the machine using the exemplary control system of FIG. 3.

FIG. 4 depicts an exemplary method 200 for determining a lateral velocity of machine 10 based on data from GNSS sensor 50 and IMU 60. Method 200 may not require inputs from sensors such as speed sensors and may instead rely only on GNSS sensor 50 and IMU 60. The steps shown in FIG. 4 and described below are merely exemplary. One or more of the steps may be omitted and/or one or more steps may be added pursuant to the present disclosure. Any equations below are merely exemplary. The equations may be altered to accommodate different assumptions, different positioning of components such as GNSS sensor 50 and/or IMU 60, and/or different qualities of machine 10. Vector and/or scalar values may be used in the equations below. Where not specified, it may be determined from context whether a value is a vector or a scalar.

In step 210, a component of system 100 such as controller 110 may obtain speed, velocity, and/or other information from GNSS sensor 50 and may obtain heading information from IMU 60. As discussed below, known equations for rigid body kinematics may be manipulated and applied to measurements from GNSS sensor 50 and/or IMU 60. For example, for a rigid body, where $v_a$ is a vector velocity of a point of interest, $a_a$ is a vector acceleration of a point of interest, $v_b$ is a vector velocity of a reference point, $a_b$ is a vector acceleration of a reference point, ω is a vector angular velocity of a rigid body, α is a vector angular acceleration of a rigid body, and $r_{b,a}$ is a position vector between a reference point and a point of interest:

$$v_a = v_b + \omega \times r_{b,a}$$

$$a_a = a_b + \alpha \times r_{b,a} + \omega \times (\omega \times r_{b,a})$$

In step 220, a component of system 100 such as controller 110 may determine a longitudinal velocity of rear wheel 20. In so doing, controller 110 may transform measurements from GNSS sensor 50 and/or IMU 60 to rear wheel 20. As with other equations described herein, the equations described below with regard to step 220 may be modified to fit any arrangement of GNSS sensor 50 and IMU 60 on machine 10. For example, assumptions made may be altered. The concepts described with regard to step 220 apply broadly outside of the exemplary equations below.

Where, for example, GNSS sensor 50 is located at a front end of machine 10, a forward lever arm between GNSS sensor 50 and rear axle 30 ($l_{G,a}$) may be dominated by a longitudinal component so that it may be assumed not to have a lateral component. For example, a longitudinal component of that forward lever arm, $l_{(G,a)y}$, may be similar to $l_1$, as shown in FIG. 2A. It may also be assumed that there is no roll or pitch rate of machine 10, so that angular velocity ω is a yaw rate with only a vertical component. Angular velocity ω may be measured by IMU 60. It may further be assumed that a longitudinal velocity of GNSS sensor 50 is the same as a longitudinal velocity of rear axle 30.

Using the rigid body kinematics equations above, a vector velocity at GNSS sensor 50, $v_G$, may be expressed using the following exemplary equation, where $v_{ay}$ is a longitudinal vector velocity at rear axle 30, $\omega_z$ is a vector yaw rate of machine 10, and $l_{(G,a)y}$ is a vector forward lever arm (longitudinal position vector) between rear axle 30 and GNSS sensor 50:

$$v_G = v_{ay} + \omega_z \times l_{(G,a)y} \quad v_G = v_a + \omega \times l_{a,G}$$

A magnitude of longitudinal velocity, $v_{ay}$, at rear axle 30 may thus be calculated according to the following exemplary equation, where the values below are scalars/magnitudes of the vector values above:

$$v_{ay} = \sqrt{v_G^2 - (\omega_z l_{(G,a)y})^2}$$

A magnitude of a wheel longitudinal velocity, $v_{wy}$ may be assumed to be the same as a magnitude of a rear axle velocity, $v_{ay}$.

In alternatives to the equations shown above with regard to step 220, any other equations that are known or may become known may be used to express a longitudinal velocity of rear axle 30, as well as a longitudinal velocity of rear wheel 20.

In step 230, a vertical and lateral acceleration of rear wheel 20 may be determined in a reference frame of rear wheel 20 by transforming measurements obtained from GNSS sensor 50 and/or IMU 60. As part of step 230, controller 110 may use an acceleration (such as a proper acceleration) measured by IMU 60 to determine a vertical and/or lateral acceleration of rear axle 30 in a frame of reference of machine 10. As described above with regard to step 220, the equations described below with regard to step 230 may be modified to fit any arrangement of GNSS sensor 50 and IMU 60 on machine 10. For example, assumptions may be altered. The concepts described with regard to step 220 apply broadly outside of the exemplary equations below.

For example, it may be assumed that a steering angle of rear wheel 20, a roll rate of machine 10, a pitch rate of machine 10, and an angular acceleration of machine 10 are zero. Where, for example, IMU 60 is located near rear axle 30, a lever arm between IMU 60 and rear axle 30 ($l_{I,a}$) may be dominated by a lateral component so that it may be assumed not to have a longitudinal component. For example, lateral lever arm $l_{(I,a)x}$ may be similar to $l_2$, as shown in FIG. 2A.

According to principles of rigid body kinematics, an acceleration of rear axle 30 in a frame of reference of machine 10 may be calculated using the following equation, where $a_{ax}$ is a magnitude of a lateral acceleration of rear axle 30, $a_{Ix}$ is a bias-corrected magnitude of a lateral acceleration measured by IMU 60, $\omega_z$ is a magnitude of a yaw rate of machine 10, as measured by IMU 60 and bias corrected, and $l_{(I,a)x}$ is a magnitude of a lateral lever arm (position vector) rear axle 30 to IMU 60:

$$a_{ax} = a_{Ix} - \omega_z^2 l_{(I,a)x}$$

A magnitude of vertical acceleration of machine 10 at rear axle 30 ($a_{az}$) may be assumed to be equal to a bias corrected magnitude of vertical acceleration measured by IMU 60 ($a_{Iz}$). Therefore:

$$a_{ax} = a_{Iz}$$

An acceleration of machine 10, such as vertical and lateral accelerations of machine 10 discussed above, may be rotated from a reference frame of machine 10 into a reference frame of rear wheel 20. Such a rotation may be determined using the below equation, where $a_{w,w}$ is an acceleration of rear wheel 20 in a reference frame of rear wheel 20, $R_{m,w}$ is a rotation matrix from machine 10 to rear wheel 20 (using, e.g., a steering angle and direction travel of rear wheel 20), and $a_{a,m}$ is an acceleration of rear axle 30 in a reference frame of machine 10:

$$a_{w,w} = R_{m,w} a_{a,m}$$

In alternatives to the equations shown above with regard to step 230, any other equations that are known or may become known may be used to express a vertical and/or lateral acceleration of rear axle 30 and/or rear wheel 20.

In step 240, a lateral velocity of rear wheel 20 may be determined in a frame of reference of rear wheel 20. As with previous steps 220 and 230, equations referenced herein with regard to step 240 are merely exemplary and any other relevant equations may be used. Similarly, any assumptions made may be altered depending on a layout of elements of machine 10, including GNSS sensor 50 and IMU 60. The concepts described with regard to step 240 apply broadly outside of the exemplary equations below.

For example, a lateral velocity of rear wheel 20 may be determined using known equations for determining a slip angle, β, of rear wheel 20, using a cornering stiffness coefficient, $C_s$, of a tire of rear wheel 20. In the equations below, $a_{wx}$ may be a magnitude of a lateral acceleration of rear wheel 20, $a_{wz}$ may be a magnitude of a vertical acceleration of rear wheel 20, $v_{wx}$ may be a magnitude of a lateral velocity of rear wheel 20, and $v_{wy}$ may be a magnitude of a longitudinal velocity of rear wheel 20.

$$\beta = -C_s \frac{a_{wx}}{a_{wz}}$$

A slip angle β may be assumed to be small so that:

$$v_{wx} = v_{wy} \tan \beta \sim v_{wy} \beta$$

In step 250, a lateral velocity of rear wheel 20 determined in step 240 may be rotated from a wheel reference frame back into a machine reference frame in order to obtain a lateral velocity of rear axle 30. This rotation back into a machine reference frame may effectively cancel out a rotation in step 230 into a wheel reference frame. Such a rotation may be determined using the below equation, where $v_{(w,w)x}$ is a lateral velocity of rear wheel 20 in a reference frame of rear wheel 20, $v_{(a,m)x}$ is a lateral velocity of rear axle 30 in a reference frame of machine 10, $R_{w,m}$ is a rotation matrix from rear wheel 20 to machine 10 (using, e.g., steering angle and direction of travel of rear wheel 20 of machine 10):

$$v_{(a,m)x} = R_{w,m} v_{(w,w)x}$$

Following rotation, a lateral velocity of rear axle 30, $v_{ax}$, may be written according to the below equation, where $C_s$ is a cornering stiffness coefficient of a tire of rear wheel 20, $v_G$ is a velocity of GNSS 50, as measured by GNSS 50; $\omega_z$ is a yaw rate, as measured by IMU 60, $l_{(G,a)y}$ is a forward lever arm from rear axle 30 to GNSS sensor 50, $a_{Ix}$ is a bias-corrected lateral acceleration measured by IMU 60, $l_{(I,a)x}$ is a lateral lever arm from rear axle 30 to IMU 60, and $a_{Iz}$ is a bias-corrected vertical acceleration measured by IMU 60:

$$v_{ax} = -C_s \sqrt{v_G^2 - (\omega_z l_{G,a})^2} \, \frac{a_{Ix} - \omega_z^2 l_{(I,a)x}}{a_{Iz}}$$

As with the other equations described herein, the equation above is merely exemplary. The equations may be altered to accommodate different assumptions, different positioning of components such as GNSS sensor 50 and/or IMU 60, and/or different qualities of machine 10. The concepts described with regard to step 250 may apply broadly outside of the exemplary equations below.

INDUSTRIAL APPLICABILITY

The disclosed aspects of the system 100 described herein may be used during operation of a machine 10 in a variety of settings. For instance, system 100 may be activated at all times in a machine 10, may be activated only when it is desired to determine a position of machine 10, or may be activated in particular situations where it is necessary to determine a precise location of machine 10 such as when machine 10 is performing intricate maneuvers. Results of process 200 may be used to, for example, accurately determine a position of machine 10. For example, a lateral velocity of machine 10 as determined in step 250 may be combined with other information, such as data from GNSS sensor 50, in order to determine a precise position of machine 10.

System 100 may be particularly useful in the context of large machines 10, especially where placement of a GNSS sensor 50 is constrained by qualities of machine 10. For example, where it is desirable to place GNSS sensor 50 at a front of machine 10, system 100 may enable more precise determination of a position of machine 10 than a GNSS sensor 50 alone. For example, in certain machines 10, such as haul trucks, harsh conditions may result in an inability to place a GNSS sensor 50 in a rear bed or dump body 18 of machine 10. For example, materials received in a bed or dump body 18 of machine 10 may damage a GNSS sensor placed toward a rear portion 14 of machine 10. However, it may be desirable to determine a position of a rear portion 14 of machine 10, such as a truck body or dump bed 18. For example, such position information may be desirable for the purpose of loading materials into a portion of machine 10, such as a truck body or dump bed 18 on a rear portion 14 of machine 10. It may be desirable to obtain such positioning information in a variety of situations, including where machine 10 is manually controlled by an operator, where machine 10 is controlled via an automated system, and/or where machine 10 is controlled by a combination of manual and automated control. Position information of a rear portion 14 of machine 10, such as information about a truck bed or dump body 18, may also be desirable where machine 10 is being reversed and thus a rear portion 14 is leading machine 10. While the examples above discuss a machine 10 with a GNSS sensor 50 at a front of machine 10, system 10 is also applicable to other types of machines 10, where a GNSS sensor 50 may be disposed in another portion of machine 10. For example, machine 10 may have a GNSS sensor 50 located at a rear of machine 10, a side of machine 10, or any other location. A location of GNSS sensor 50 may be influenced by functions and/or physical aspects of machine 10. Because system 100 uses data from GNSS sensor 50 and IMU 60 but does not require use of other sensors, system 100 allows cost-effective and precise measurement of a location of machine 10 without using sensors such as speed sensors.

It will be apparent to those skilled in the art that various modifications and variations can be made to the disclosed system without departing from the scope of the disclosure. Other embodiments of the system will be apparent to those skilled in the art from consideration of the specification and practice of the machine disclosed herein. It is intended that the specification and examples be considered as exemplary only, with a true scope of the disclosure being indicated by the following claims and their equivalents.

What is claimed is:

1. A system for determining movement characteristics of a mobile machine, comprising:
    a sensor coupled to the machine and configured to communicate a signal indicative of a velocity of the machine, wherein the sensor is coupled to a portion of the machine that is disparate from a rear axle of the machine;
    an inertial measurement unit coupled to the machine and configured to communicate a signal indicative of an acceleration and an angular velocity of the machine; and
    a controller configured to:
        receive (a) the velocity signal and (b) the acceleration and angular velocity signal; and
        using (a) the velocity signal and (b) the acceleration and angular velocity signal, determine a lateral velocity of the rear axle of the machine.

2. The system of claim 1, wherein using (a) the velocity signal and (b) the acceleration and angular velocity signal comprises determining a longitudinal velocity of a rear wheel of the machine.

3. The system of claim 1, wherein using (a) the velocity signal and (b) the acceleration and angular velocity signal comprises determining an acceleration of a rear wheel of the machine.

4. The system of claim 3, wherein determining an acceleration of the rear wheel of the machine comprises determining at least one of a vertical acceleration of the rear wheel and a lateral acceleration of the rear wheel.

5. The system of claim 1, wherein using the (a) the velocity signal and (b) the acceleration and angular velocity signal comprises determining at least one of a velocity and an acceleration of the rear axle of the machine.

6. The system of claim 1, wherein the sensor is coupled to a front portion of the machine.

7. The system of claim 1, wherein the only sensors used in they system are (a) the sensor; and (b) the inertial measurement unit.

8. The system of claim 1, further comprising using a cornering stiffness coefficient to determine a slip angle of the rear axle.

9. The system of claim 1, wherein the sensor is a global navigation satellite system sensor.

10. A method for determining movement characteristics of a mobile machine, comprising:
    receiving a signal from a sensor coupled to the machine, wherein the sensor is coupled to the machine at a location disparate from a rear axle of the machine;
    receiving a signal from an inertial measurement unit coupled to the machine;
    using at least one of the sensor signal and the inertial measurement unit signal to determine a longitudinal velocity of the machine;
    using at least one of the sensor signal and the inertial measurement unit signal to determine an acceleration of the machine; and
    using the determined longitudinal velocity and the determined acceleration to determine a lateral velocity of the rear axle of the machine.

11. The method of claim 10, wherein the sensor signal includes a velocity signal.

12. The method of claim 10, wherein the inertial measurement unit signal includes an acceleration of the machine.

13. The method of claim 10, wherein the sensor is a global navigation satellite system sensor.

14. The method of claim 10, wherein the longitudinal velocity includes a longitudinal velocity of a rear wheel of the machine.

15. The method of claim 10, wherein the acceleration includes an acceleration of a rear wheel of the machine.

16. The method of claim 10, wherein the sensor is coupled to a front portion of the machine.

17. The method of claim 10, wherein the only signals received are (a) the sensor signal; and (b) the inertial measurement unit signal.

18. A method for characterizing movement of a machine, comprising:
   receiving signals from only:
      (a) a sensor coupled to a front portion of the machine; and
      (b) an inertial measurement unit coupled to the machine, wherein the signal includes an angular velocity of the machine; and
   using the sensor signal and the inertial measurement unit signal to determine a lateral velocity of a rear axle of the machine.

19. The method of claim 18, wherein using the sensor signal and the angular velocity signal comprises determining a longitudinal velocity of a rear wheel of the machine.

20. The method of claim 18, wherein using the sensor signal and the angular velocity signal comprises determining an acceleration of a rear wheel of the machine.

* * * * *